(12) United States Patent
Faucheaux et al.

(10) Patent No.: US 7,623,411 B2
(45) Date of Patent: Nov. 24, 2009

(54) STABILIZED STREAMER CONNECTION SYSTEM

(75) Inventors: Eddie J. Faucheaux, Waggaman, LA (US); André W. Olivier, River Ridge, LA (US); Ronald K. Barry, River Ridge, LA (US)

(73) Assignee: Input/Output, Inc., Stafford, TX (US)

( * ) Notice: Subject to any disclaimer, the term of this patent is extended or adjusted under 35 U.S.C. 154(b) by 167 days.

(21) Appl. No.: 11/753,624

(22) Filed: May 25, 2007

(65) Prior Publication Data

US 2008/0291778 A1  Nov. 27, 2008

(51) Int. Cl.
*G01V 1/20* (2006.01)
*G01V 1/38* (2006.01)

(52) U.S. Cl. .......................... 367/16; 367/20

(58) Field of Classification Search ............ 367/16, 367/20; 114/245; 248/63, 74.1, 74.3
See application file for complete search history.

(56) References Cited

U.S. PATENT DOCUMENTS

| | | | |
|---|---|---|---|
| 3,648,642 A | 3/1972 | Fetrow et al. | |
| 3,931,608 A | 1/1976 | Cole | |
| 4,222,340 A * | 9/1980 | Cole | 114/245 |
| 4,711,194 A | 12/1987 | Fowler | |
| 4,879,719 A | 11/1989 | Dumestre, III | |
| 5,214,612 A | 5/1993 | Olivier et al. | |
| 5,278,804 A | 1/1994 | Halvorsen | |
| 5,507,243 A | 4/1996 | Williams et al. | |
| 5,529,011 A | 6/1996 | Williams, Jr. | |
| 5,619,474 A | 4/1997 | Kuche | |
| 5,709,497 A | 1/1998 | Zoch et al. | |
| 6,034,923 A | 3/2000 | Wooters | |
| 6,091,670 A | 7/2000 | Olivier et al. | |
| 6,144,618 A | 11/2000 | Broussard et al. | |
| 6,263,823 B1 | 7/2001 | Olivier | |
| 6,477,111 B1 | 11/2002 | Lunde et al. | |
| 7,092,315 B2 | 8/2006 | Olivier | |

FOREIGN PATENT DOCUMENTS

| | | |
|---|---|---|
| GB | 2394047 A | 4/2004 |
| JP | 57028278 A | 2/1982 |

OTHER PUBLICATIONS

European Patent Office, "International Search Report of PCT/US08/63143," Jul. 18, 2008, ISA/EP, Rijswijk, Netherlands.

* cited by examiner

*Primary Examiner*—Ian J Lobo
(74) *Attorney, Agent, or Firm*—James T. Cronvich

(57) ABSTRACT

A connection system for connecting external devices to a streamer. The connection system comprises three outer collars maintained collinearly aligned by a stabilizing member, such as a lightweight, rigid tube, attached to each outer collar. The tube extends parallel to the bores of the outer collars. The forward and aft outer collars ride on races formed on the periphery of inner collars clamped around mounting structure in the interior of the streamer. An external device is attached to the forward collar and to the intermediate collar, which does not ride on an inner collar. The spacing between the forward and intermediate collars is fixed by the standard spacing of the two attachment points in standard external devices. The spacing between the forward and aft collars is set by the specified spacing of mounting structures in the interior of the streamer.

19 Claims, 3 Drawing Sheets

STABILIZED STREAMER CONNECTION SYSTEM

BACKGROUND

This invention relates to marine seismic prospecting and, more particularly, to a stabilized connection system for attaching equipment to seismic streamers.

A marine seismic streamer is a cable, typically several thousand meters long, that contains arrays of hydrophones and associated electronic equipment along its length. One purpose of the streamer is to position the hydrophone array at a known depth and position relative to a towing vessel in a survey area. Externally mounted equipment, such as depth controllers, called "birds," lateral-position controllers, emergency recovery pods, and acoustic pods, performs the functions of positioning, controlling, and recovering the cable.

Individual external devices are attached to the streamer at various positions along its length. In one conventional streamer connection system, a collar arrangement uses a hinge and latch mechanism for operation. Examples of this kind of system are described in U.S. Pat. No. 5,507,243, "Connector For Underwater Cables," Apr. 16, 1996, to Oneil J. Williams et al. and in U.S. Pat. No. 5,709,497, "Latching Device," Jan. 20, 1998, to David W. Zoch et al. Another conventional connection system uses C-shaped collars that slip radially onto the cable and slide axially into position. Examples of this system are described in U.S. Pat. No. 6,263, 824, "Connection System for Connecting Equipment to Underwater Cables," Jul. 24, 2001, to André W. Olivier. The C-shaped collars dispense with the need for hinges and latches. Yet another connection system using C-shaped collars specially designed to maintain themselves coaxially aligned even when the cable is subjected to severe bending forces is described in commonly owned pending U.S. patent application Ser. No. 11/669,650, "Streamer Connection System." The disclosures of all the references mentioned in this paragraph are incorporated by reference. All these kinds of outer collars, with external devices attached, are attached around inner collars affixed to the cable as the cable is payed out from the back deck of a survey vessel. Circular cylindrical inner surfaces on the outer collars ride on races formed on the exterior of the inner collars. This allows the streamer to rotate inside the outer collars without also rotating the external devices.

Most external devices attach to a pair of outer collars separated by a standard distance of about 57 cm (22.5 in). This separation is set by the fixed spacing of spacer blocks and communication coil mounts within the streamer. These relatively rigid objects provide a firm structure under the skin of the streamer about which the inner collars can be clamped. Because most early streamers were constructed with the standard separation of about 57 cm, external devices were constructed with fixed attachment points 57 cm apart. Some newer streamers, however, have been constructed with communication coil mounts and spacer blocks at different intervals not compatible with the 57-cm fixed spacing of conventional external devices.

Thus, there is a need for a streamer connection system that can adapt to streamers having communication coils mounts and spacer blocks separated by distances not equal to the fixed spacing of attachment points on external devices.

SUMMARY

This need and other needs are satisfied by a streamer connection system having features of the invention. In one aspect, a connection system for connecting external devices to a streamer comprises three outer collars having outer peripheries and inner axial bores for receiving a streamer. A stabilizing member connected to the three outer collars maintains their axial bores collinearly aligned.

In another aspect of the invention, a connection system comprises first and second inner collars having axial bores for receiving a streamer. Each inner collar is coaxially affixed to the streamer at spaced locations along its length. A first outer collar has an outer periphery and an inner axial bore for rotatably receiving the first inner collar. A third outer collar has an outer periphery and an inner axial bore for rotatably receiving the second inner collar. A second outer collar having an outer periphery is disposed between the first and third outer collars. The second outer collar's axial bore receives the streamer. A stabilizing member connected to the three outer collars maintains their axial bores in alignment.

BRIEF DESCRIPTION OF THE DRAWINGS

These features and aspects of the invention, as well as its advantages, are better understood by referring to the following description, appended claims, and accompanying drawings, in which:

FIG. 3 is a cross section of the streamer taken along lines 3C of FIG. 1.

DETAILED DESCRIPTION

Figure 1:
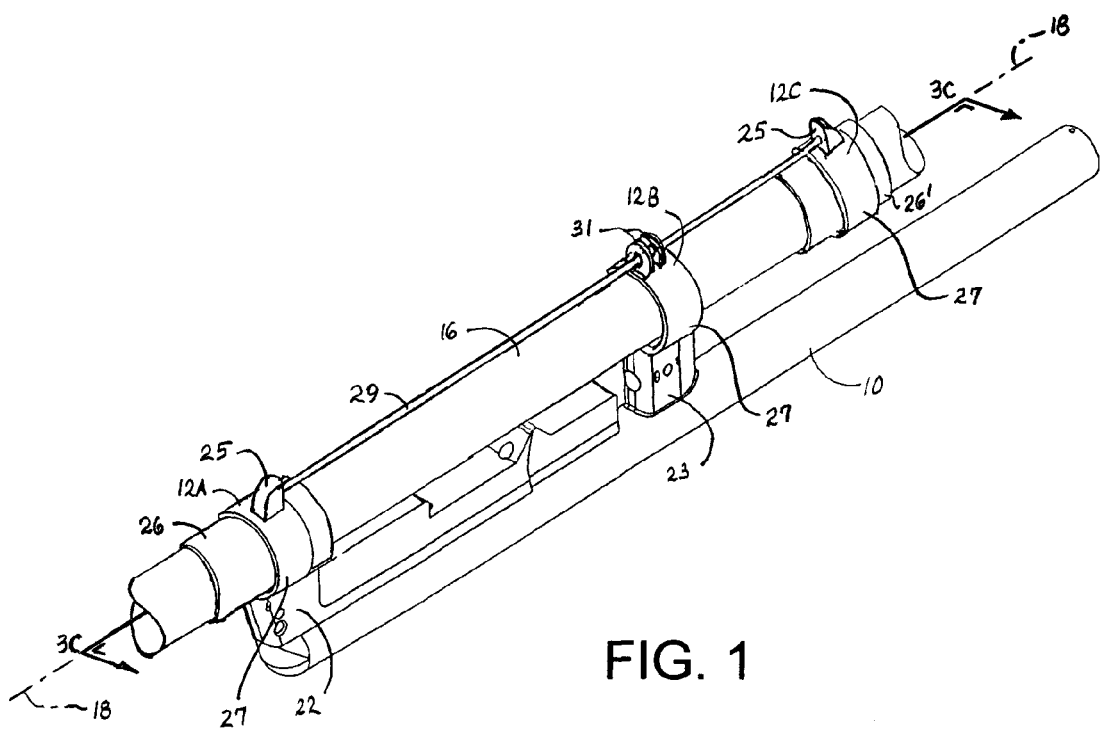
FIG. 1 is an isometric view of a connection system embodying features of the invention shown connecting an external device to a section of a streamer.
Figure 2:
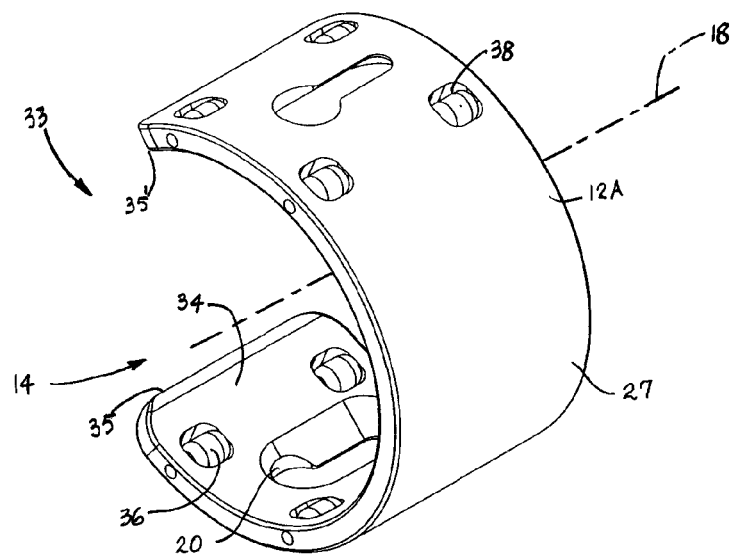
FIG. 2 is an isometric view of one version of an outer collar usable in the connection system of FIG. 1.

A connection system embodying features of the invention for connecting external devices to a streamer is shown in FIGS. 1-3. An external device 10, such as a cable-leveling bird, a cable-steering device, an acoustic transceiver, or a velocimeter, is attached at two positions to outer collars 12A and 12B. The outer collars, which are preferably made of a strong, lightweight material, such as titanium or a titanium alloy, have central bores 14 sized to receive a streamer 16. In a preferred condition, the axes 18 of the bores coincide, and the streamer section between the two outer collars is straight and coaxial with the bores. The external device is attached to the outer collars with pins (not shown) that extend outward from fore and aft pylons 22, 23 to engage keyways 20 formed in the collars at diametrically opposite positions.

Not connected directly to the external device is a third outer collar 12C aft of the first two outer collars 12A and 12B. End mounts 25 attached to the outer peripheries 27 of the first and third outer collars support opposite ends of a stabilizing member 29. Intermediate mounts 31 affixed to the periphery of the second collar 12B are attached to an intermediate portion of the stabilizing member. Preferably, the stabilizing member is a hollow tube made of a lightweight, rigid material, such as titanium, aluminum, an alloy, or a composite. The stabilizing member could alternatively be a beam, such as an I-beam, or any other such construction that acts as a stress member resistant to bending and deflection. The mounts are preferably spaced apart circumferentially 180° around the peripheries of the outer collars from the keyway 20 to which the external devices are attached on the first and second collars. In this way, the stabilizing member is diametrically opposite the external device to ease ballasting of the external device and the connection system. But the mounts for the external device do not necessarily have to be located on the collars diametrically opposite the stabilizing member. The stabilizing member maintains the axial bores of the three outer collars collinearly aligned to ensure that the axis of the external device connected to the forward two outer collars is parallel to the streamer axis.

Figure 3A:
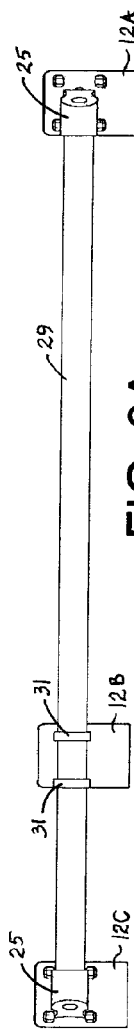
FIGS. 3A, 3B, 3C, and 3D are radial views of the connection system as in FIG. 1 taken from mutually orthogonal viewpoints.
Figure 3B:
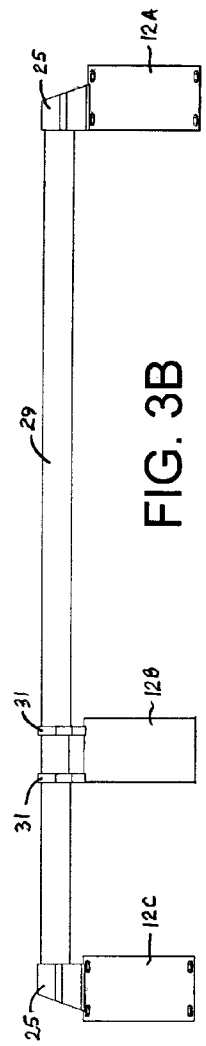
Figure 3C:
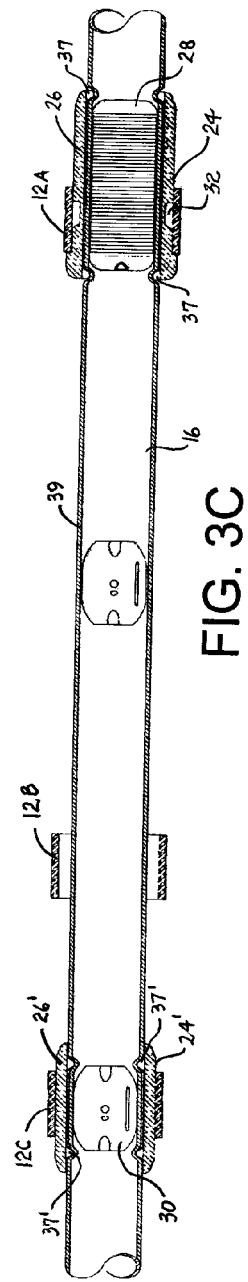
Figure 3D:
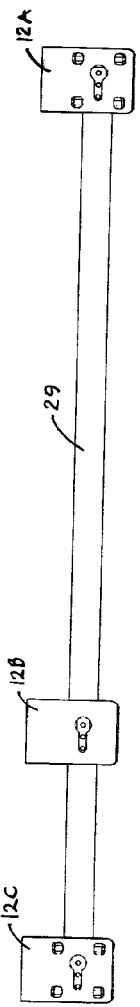

As better shown in FIG. 3C, the forward and aft outer collars 12A and 12C actually ride on races 24, 24' formed on the peripheries of inner collars 26, 26' clamped around the streamer 16 at the positions of a communication coil mount 28 and a spacer block 30 residing in the interior of the streamer 16. The inner collars 26, 26' have inner circumferential ridges 37, 37' spaced to mate with either a communication coil mount or a shorter spacer block. The ridges indent the skin 39 of the streamer around the spacer block or the communication coil mount to hold the inner collars in position in the streamer. The inner collars are preferably made of a hard plastic material. A retractable latch pin (not shown) extends outward of the forward pylon 22 of the external device into a circumferential groove 32 in the periphery of the forward inner collar to retain the outer collar in position on the inner collar. The forward and aft outer collars are free to move about the streamer on the races of the inner collars. Unlike the other outer collars, the intermediate outer collar 12B does not ride on the race of an inner collar. It merely surrounds the streamer, whose outer diameter is less than the inner diameter of the collar's axial bore. In this way, the external device can maintain a constant radial position relative to the streamer axis as the streamer rotates within the bores of the outer collars.

The outer collar 12A shown in FIG. 2 is C-shaped with an opening 33 between opposite ends 35, 35' of the collar. The opening is wide enough to allow the collar to be slipped radially onto the streamer 16. (Once the streamer is received in the outer collar's bore, the outer collar can be slid axially onto an inner collar to assume the position shown in FIG. 3C.) The size of the opening is less than the diameter of the bore 14 to provide an inner face 34 that extends circumferentially through an arc of between 180° and 360°. Pin bearings 36 protrude from cavities 38 in the collar into the inner bore 14. The bearings are mounted on axles 40 arranged parallel to the axis 18 at four positions forming corners of an imaginary curvilinear rectangle encompassing each keyway 20. The pin bearings reduce friction between the inner and outer collars. Because the intermediate outer collar 12B does not ride on an inner collar, it needs no pin bearings.

The stabilizing member permits external devices having standard attachment point dimensions to be used in streamers with non-standard spacings between communication coil mounts and spacer blocks. The distance between the forward and intermediate outer collars is determined by the distance between the devices' two attachment points. The distance between the fore and aft outer collars is determined by the specified spacing of the communication coil mount and the next spacer block aft of the intermediate outer collar.

Figure 4:
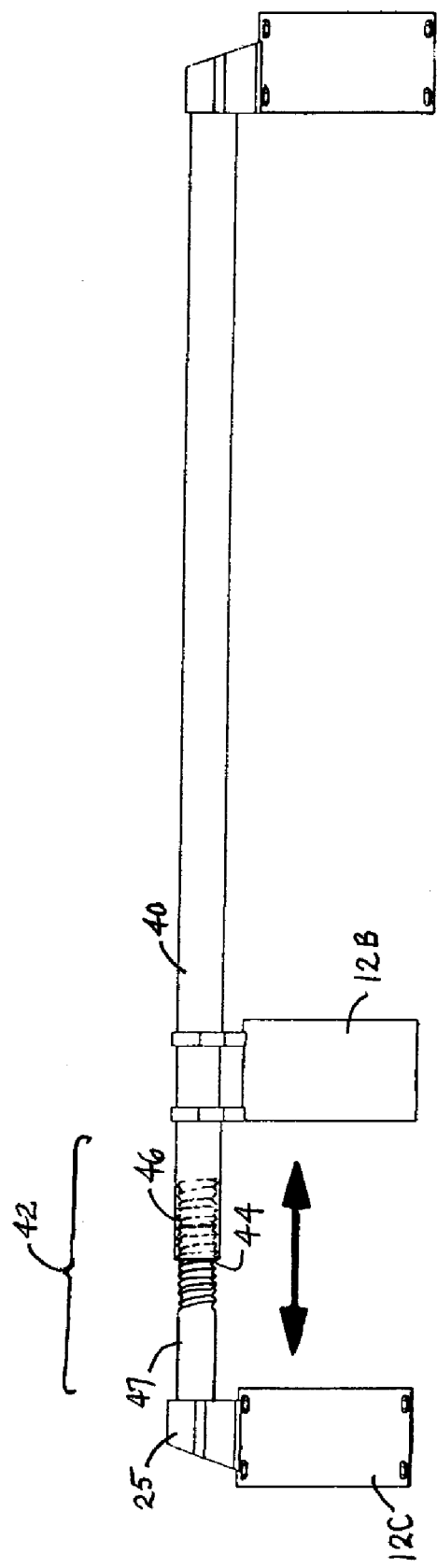
FIG. 4 is a side view of another version of the connecting system of FIG. 1 with a length-adjustable section.

As shown in FIG. 4, the fixed-length stabilizing member can be replaced by an adjustable-length stabilizing member 40. In this example, a rear section 42 of the stabilizing member between the two rear outer collars 12B and 12C is adjustable in length by a threaded connection 44 between an internally threaded portion 46 of the stabilizing member and an externally threaded end 47 supported in the rear end mount 25. This allows the streamer connection system to adapt to other non-standard streamers.

Although the invention has been described in detail with reference to a few preferred versions, other versions are possible. For example, the length-adjustable stabilizing member can be realized with a telescoping section or by insert sections. As another example, one or more of the end mounts or the intermediate mounts could be slidable along the stabilizing member to change the spacings between the outer collars. So, as these few examples suggest, the spirit and scope of the claims should not be limited to the description of the preferred versions described in detail.

What is claimed is:

1. A connection system for connecting external devices having two attachment points to a streamer, the connection system comprising:
    first, second, and third outer collars having outer peripheries and inner axial bores for receiving a streamer;
    a stabilizing member connected to the first, second, and third outer collars to maintain the axial bores of the outer collars collinear, wherein the stabilizing member is a linear body attached to the outer collars at positions spaced apart circumferentially around the peripheries of the outer collars from the position of an external device attached to the connection system, and
    wherein only two of the outer collars attach to an external device at two attachment points.

2. A connection system as in claim 1 wherein the second outer collar is disposed between the first and third outer collars and wherein an external device connects to the first and second outer collars.

3. A connection system as in claim 2 wherein the first and third outer collars include roller bearings protruding into the axial bores.

4. A connection system as in claim 2 further comprising a first inner collar surrounding the streamer at a first location and forming a first race and a second inner collar surrounding the streamer at a second location and forming a second race, wherein the first outer collar rides on the first race and wherein the third outer collar rides on the second race.

5. A connection system as in claim 2 wherein the stabilizing member is adjustable to adjust the distance between the second and third outer collars.

6. A connection system as in claim 2 wherein the distance between the first and second outer collars is fixed.

7. A connections system as in claim 2 wherein the stabilizing member is threadedly connected to the third outer collar to adjust the distance between the second and third outer collars.

8. A connection system as in claim 1 further comprising mounting blocks affixed to the periphery of each of the outer collars and wherein the stabilizing member comprises a rigid tube attached to each of the mounting blocks.

9. A connection system as in claim 6 further comprising a threaded connection between the rigid tube and the mounting block affixed to the third collar to adjust the distance between the second and third outer collars.

10. A connection system as in claim 1 wherein the stabilizing member is attached to the outer collars at positions on the peripheries of the outer collars on an opposite side of the streamer from the position of an external device attached to the connection system.

11. A connection system for connecting external devices to a streamer, the connection system comprising:
    a first inner collar having an axial bore receiving a streamer, wherein the first inner collar is coaxially affixed to the streamer at a first location along the length of the streamer;

a second inner collar having an axial bore receiving the streamer, wherein the second inner collar is coaxially affixed to the streamer at a second location along the length of the streamer;

a first outer collar having an outer periphery and an inner axial bore for rotatably receiving the first inner collar;

a third outer collar having an outer periphery and an inner axial bore for rotatably receiving the second inner collar;

a second outer collar disposed between the first and third outer collars and having an outer periphery and an inner axial bore for receiving the streamer;

a length-adjustable stabilizing member connected to the first, second, and third outer collars to maintain the axial bores of the outer collars in alignment and to adjust the distance between the second and third outer collars.

12. A connection system as in claim 11 wherein the stabilizing member is a linear body arranged parallel to the axial bores of the inner collars.

13. A connection system as in claim 11 further comprising a first end mount affixed to the outer periphery of the first outer collar, a second end mount affixed to the outer periphery of the third outer collar, and an intermediate mount attached to the outer periphery of the second inner collar, and wherein the stabilizing member is an elongated body having a first end supported in the first end mount, an opposite second end supported in the second end mount, and an intermediate portion supported by the intermediate mount.

14. A connection system as in claim 11 wherein the stabilizing member is a rigid, hollow tube.

15. A connection system as in claim 11 wherein the stabilizing member is attached to the outer peripheries of the outer collars and wherein the first and second outer collars include means for attaching an external device to the outer peripheries of the first and second outer collars diametrically opposite the stabilizing member.

16. A connections system as in claim 11 wherein the stabilizing member is threadedly connected to the third outer collar to adjust the distance between the second and third outer collars.

17. A connection system for connecting an external device having two attachment points separated by a first distance to a streamer having two spacer blocks separated by a greater second distance, the connection system comprising:

a first inner collar having an axial bore receiving a streamer, wherein the first inner collar is coaxially affixed to the streamer at a first location along the length of the streamer corresponding to the location of a spacer block in the streamer;

a second inner collar having an axial bore receiving the streamer, wherein the second inner collar is coaxially affixed to the streamer at a second location along the length of the streamer corresponding to the location of another spacer block in the streamer and separated from the first location by a distance corresponding to the separation of the spacer blocks in the streamer;

a first outer collar having an outer periphery and an inner axial bore for rotatably receiving the first inner collar;

a third outer collar having an outer periphery and an inner axial bore for rotatably receiving the second inner collar;

a second outer collar disposed between the first and third outer collars and having an outer periphery and an inner axial bore for accommodating the streamer and spaced from the first outer collar by a distance corresponding to the separation of the two attachments points of an external device attachable to the first and second outer collars at the attachment points;

a stabilizing member connected to the first, second, and third outer collars to maintain the axial bores of the outer collars in alignment.

18. A connection system as in claim 17 wherein the stabilizing member is adjustable in length to change the distance between the second and third outer collars.

19. A connection system as in claim 17 wherein the second outer collar surrounds the streamer at a location devoid of an inner collar.

* * * * *